United States Patent [19]

Nagler

[11] Patent Number: 4,832,429
[45] Date of Patent: May 23, 1989

[54] SCANNING IMAGING SYSTEM AND METHOD

[75] Inventor: Michael Nagler, Reseda, Calif.

[73] Assignee: T. R. Whitney Corporation, Reseda, Calif.

[21] Appl. No.: 815,121

[22] Filed: Dec. 30, 1985

Related U.S. Application Data

[63] Continuation of Ser. No. 459,230, Jan. 19, 1983, abandoned.

[51] Int. Cl.$^4$ .............................................. G02B 26/10
[52] U.S. Cl. ...................................... 350/6.8; 350/446
[58] Field of Search .................................. 350/6.8, 446

[56] References Cited

U.S. PATENT DOCUMENTS

| | | |
|---|---|---|
| 3,272,151 | 6/1981 | Balasubramanian . |
| 3,469,030 | 9/1969 | Priebe . |
| 3,520,586 | 7/1970 | Bousky . |
| 3,782,803 | 1/1974 | Buck . |
| 3,866,038 | 2/1975 | Korth ................................. 350/6.8 |
| 3,881,801 | 5/1975 | Bechtold . |
| 3,973,825 | 8/1976 | Starkweather . |
| 4,029,389 | 6/1977 | Runciman . |
| 4,176,907 | 12/1979 | Matsumoto et al. . |
| 4,210,810 | 7/1980 | Berry et al. . |
| 4,230,394 | 10/1980 | Brueggemann et al. . |
| 4,274,703 | 6/1981 | Fisli . |
| 4,355,860 | 10/1982 | Lavallee et al. .................... 350/6.8 |
| 4,508,422 | 4/1985 | Karlsson . |
| 4,512,625 | 4/1985 | Brueggemann . |

Primary Examiner—John K. Corbin
Assistant Examiner—Rebecca D. Gass
Attorney, Agent, or Firm—Merchant & Gould

[57] ABSTRACT

A light beam focusing system provides a diffraction limited spot across a wide flat field format by using a scanning surface arranged with a system of spherical mirrors to achieve dynamic field flattening. The scanning surface is pivoted about an axis of rotation to image the beam along a noncircular image line, and the spherical mirror system provides magnification of the image in a sense and amplitude to provide a substantially uniform focused scanning spot throughout the flat object field. The system compensates for higher order spherical aberrrations, is fully achromatic and can be used with high power beams.

27 Claims, 5 Drawing Sheets

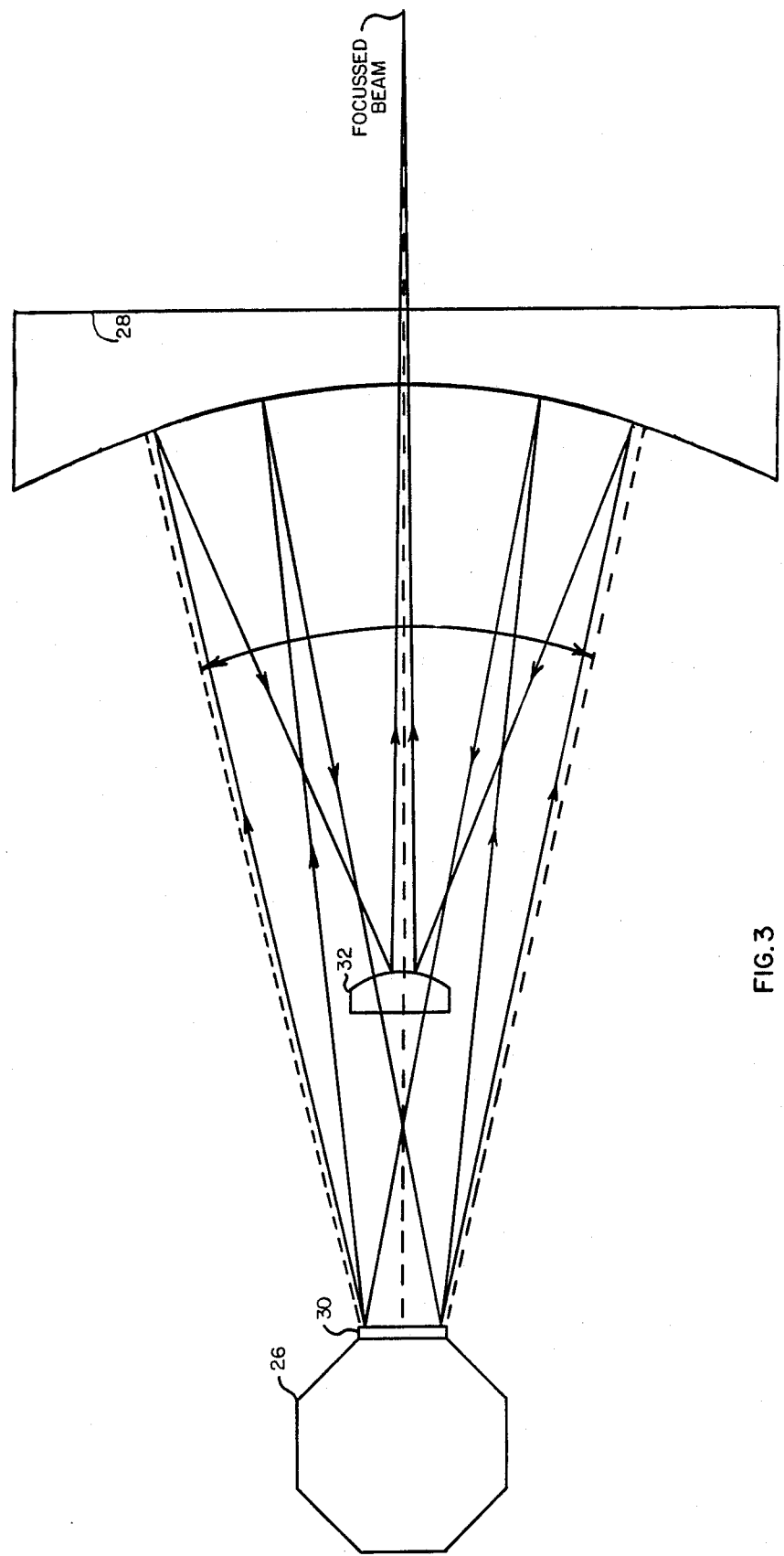

SCANNING IMAGING SYSTEM AND METHOD

This is a continuation of co-pending application Ser. No. 459,230 filed on Jan. 19, 1983, now abandoned.

BACKGROUND OF THE INVENTION

This invention relates to systems and methods for scanning a focused beam relative to a flat field, and more particularly to systems and methods for providing precise focusing of a scanning beam over a large flat field format along one axis.

Light beam scanning systems are now in wide use for various forms of printing, recording or reproduction of data or graphical information, displays and for readout of data and graphical information. Because of the capability of modern data processing systems and data reproduction systems for handling large amounts of data at high speeds, raster scan rates of the order of hundreds of lines per second are generally employed. A thin light beam source, most often a laser in modern systems, is repeatedly deflected in one direction by successive faces of a rotating polygon as the object surface is moved in the orthogonal direction by a carriage or drum. Oscillating scanning devices are also employed in such systems, although the beam scan may be used only during alternate half cycles or beam scans may alternate in direction. The scanning mechanism diverts the beam into an optical imaging system which is configured to maintain a selected degree of focus on the object surface throughout what may be a considerable scan angle and distance.

While many such light beam based writing and reading systems are in use, the scanning imaging systems heretofore employed do not fully meet the needs of the modern state of the art. Some systems are based upon the use of a collimated beam and a relatively expensive $f\theta$ lens system, or another complicated lens geometry. Such systems are not readily feasible or economic where it is desired to focus a beam when the spot size is very small and field very large. A number of somewhat conflicting requirements must be met if precise focusing over a wide flat field format is to be accomplished with a scanning imaging system of reasonable cost. In using a reflective scanner such as a rotating polygon scanning a noncollimated beam, a variable but predictable error is introduced during each scan because the reflective face of the polygon is spaced apart from the axis of rotation. Corrective optical systems have been devised for compensating for this variation, as well as the different path lengths that exist at different scan angles relative to a flat field. Such compensating optical systems, however, require a number of elements, and thus become very costly, particularly where large field formats (e.g. ~17" or $f$ 450 mm) are to be employed. Also, modern applications increasingly demand higher resolution, such as 2000 pixels per inc., and the higher order of precision demands substantially more expensive optics than even prior art systems have had to use. Furthermore, refractive optics introduce problems with chromatic aberration, off-axis aberrations and light attenuation that must also be confronted and the solutions to which invariably add cost and complexity. Increased costs become disproportionate as resolution is increased, because optical and chromatic aberrations impose substantially greater penalties. A new system is needed in order to provide the needed close focusing, preferably diffraction limited, over a wide flat field without involving penalties in size, cost, or other aspects of performance.

SUMMARY OF THE INVENTION

In systems and methods in accordance with the invention, spherical reflectors are utilized in conjunction with a flat surface scanning element that changes angle relative to a spaced apart axis of rotation, to achieve dynamically flattened diffraction limited focusing of a beam throughout a scan path on a flat object field. Two or more spherical reflecting surfaces in the imaging system are disposed with radii of curvature and displacements such that the nonlinearity introduced by the off-axis scanning surface is used in a sense and magnitude to focus the beam across the entire flat object plane.

Further, although the dynamic field flattening does not provide an exact match, it is shown that the depth of field can be so utilized that beam size is in focus and of substantially constant size throughout. In addition, by proper selection of parameters this focus is essentially diffraction limited. The only spherical aberrations introduced by the system are of small magnitude and readily compensated in the prescanning beam path.

In a more particular example of a system in accordance with the invention, both a principal beam and a parallel, closely spaced, reference beam are deflected off the successive faces of a rotating polygon onto a spherical concave mirror positioned with its center of curvature at the polygon. The scanning beam is reflected twice off different regions of the concave mirror and then reflected off a convex folding mirror having the same center of curvature. From this surface, the scanning principal beam and reference beam enter a folding light path system within the volume between the principal mirror and the rotating polygon, being directed first upwardly by a first linear folding mirror and then downwardly. The primary beam impinges on the flat horizontal object plane while the reference beam is intercepted by the edge of an elongated mirror surface so as to fall on a reference scale parallel to the scan axis direction. Both principal and reference beams scan, in focus, throughout a wide lateral scan dimension. Furthermore, mirror spherical aberration in the system is compensated in one embodiment by the usage of a negative lens in the prescanning beam, and this lens may be tilted to further compensate for errors in one dimension.

BRIEF DESCRIPTION OF THE DRAWINGS

A better understanding of the invention may be had by reference to the following description, taken in conjunction with the accompanying drawings, in which:

FIG. 3 is a top view of the arrangement of FIG. 1 simplified as FIG. 2 above;

DETAILED DESCRIPTION OF THE INVENTION

Figure 1:
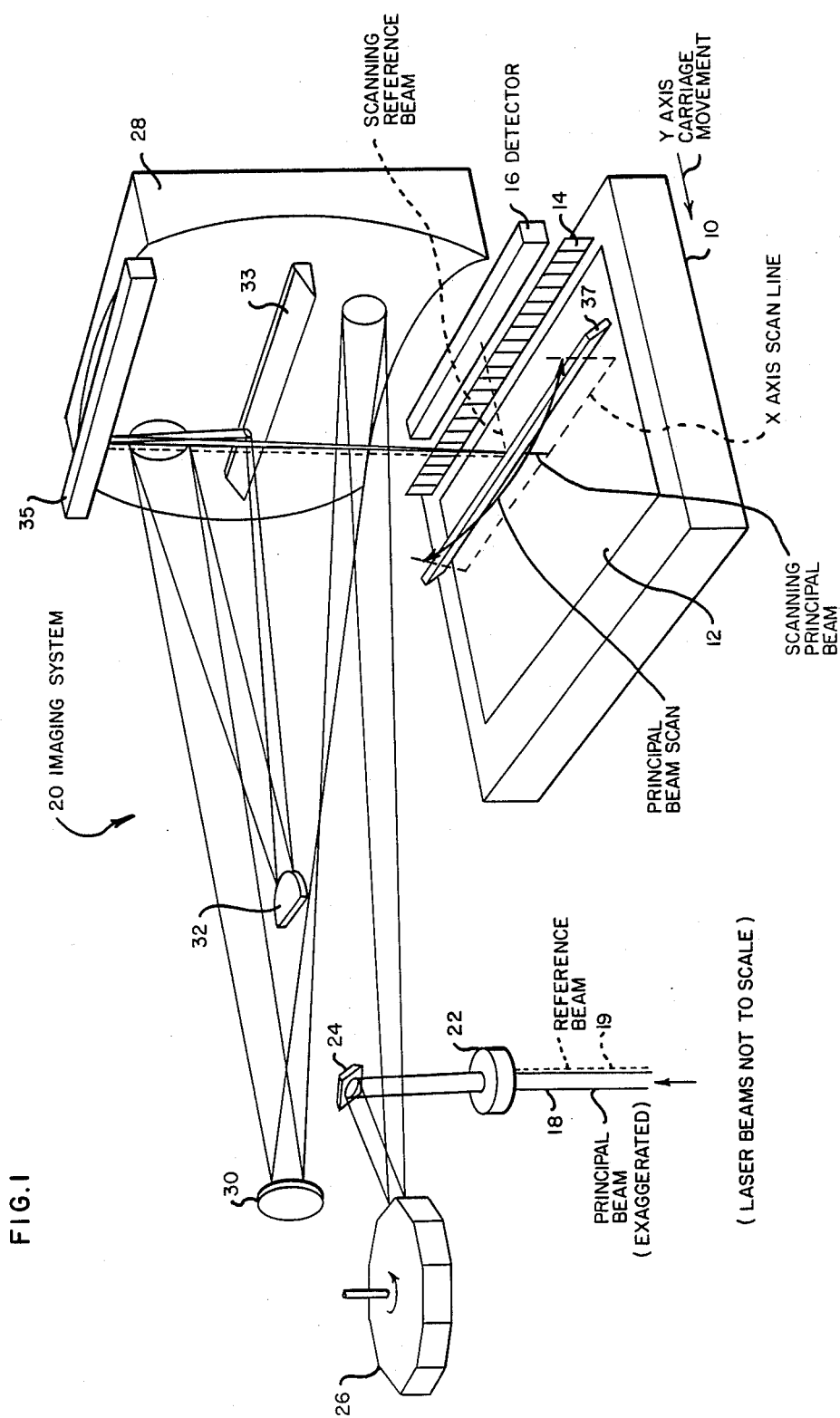
FIG. 1 is a perspective simplified representation of an optical system in accordance with the invention depicting the light beam path through the system.
Figure 2:
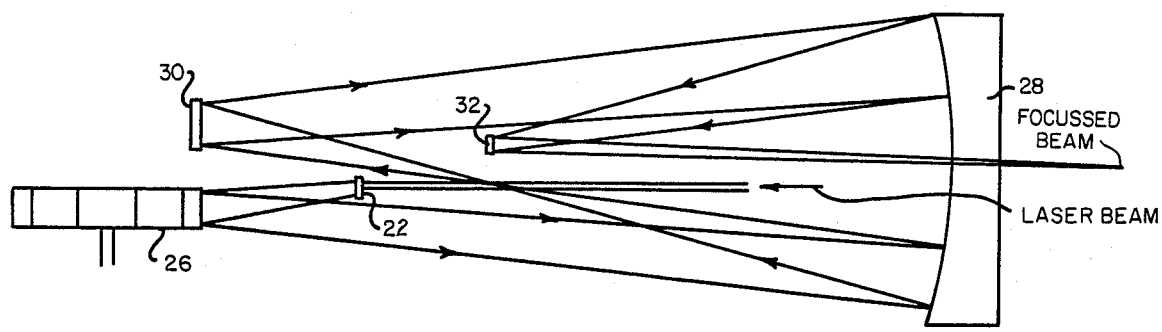
FIG. 2 is a said view of the arrangement of FIG. 1 omitting some of the beam folding mirrors and showing the focused beam as following a linear path.

A system in accordance with the invention, referring now to FIGS. 1–3, is depicted as it is used in conjunction with a practical application in which a reference object plane is defined by the top surface of a carriage 10 on which a document or storage medium 12 rests. In other applications this may be a display surface or a linear sensor array. For ease of description and to conform to the actual exemplification, the carriage 10 is referred to as lying along a horizontal plane and translated along this plane by a drive of any conventional type (not shown in detail) in incremental or continuous motion. The carriage direction may be referred to as the Y axis, and the document 12 is scanned at high speed in the orthogonal, or X axis, direction. Details of this portion of the system have been omitted for simplicity and brevity, and it will be appreciated that the reference plane need not be horizontal but can be in any attitude. The document 12 may comprise a document used in electrostatic recording, a photographic film medium, or a photosensitive member utilized in forming a master such as a printing plate. The term is also used generically to include other forms of media which can be scanned by a modulated write beam or scanned by an unmodulated beam for detection of printed or graphical patterns or data on the surface.

The X axis scan line is a precisely fixed reference line, here 17-½" (444 mm) long along which a principal laser beam is repeatedly scanned during Y axis translation of the document 12. As discussed below, a relatively wide scan angle of ±10° is used to cover this field. Concurrently, a closely spaced apart an substantially parallel reference beam of lower power moves through the optical system to impinge on an adjacent reference scale 14, and actuates an adjacent sensor 16 to provide reference signals used for Y axis serving of the beam and X axis clocking of the data. Associated processors can use these reference signals without special or expensive corrective optics being needed to achieve linearity although the servo and clocking schemes do not form part of the present system and therefore are not described in detail. If the system is to be used as a document scanner the same reference beam arrangement can be employed, but a photosensitive detector (not shown) is also disposed to sense reflected light variations off the document 12. The beams are not drawn to scale in order to depict relationships in readily interpretable fashion.

In the system of FIGS. 1–3, the substantially collimated principal beam 18, modulated with serial data to be written on the document 12, is directed along with the lower power, closely adjacent and substantially parallel reference beam 19 into an imaging system 20 in accordance with the invention. The imaging system 20 may be characterized as a substantially modified Schwartzchild system that effects dynamic field flattening, and is geometrically arranged in a folded optical path that facilitates use of optical elements of reasonable size. The prescanning beam is first expanded slightly by a negative lens 22 which corrects for spherical aberration in the system, as is described in greater detail hereafter. This particular spherical aberration can alternatively be corrected by overcorrecting elements used in different ways, as noted below, but the negative lens 22 is the only refractive element in the system and is readily implemented. The prescription for the lens is as follows, given a lens-to-scanning-polygon distance of 101.887 mm, and with the polygon at the center of curvature:

R = −398.506 mm
T = 2 mm
N = 1.52612 mm
R = 15.922 mm

Starting with the substantially collimated principal beam 18 and reference beam 19, it should be noted that the Figures show the prescanning beam substantially exaggerated with different parts of the scanning beam thereafter being only approximations. It is desired with this system that a diffraction limited beam, with a spot diameter of 17.5 μm in the tangential direction, be focused on the flat object field in order to scan the document 12. Entry of the light beam into the imaging system commences at a first beam folding mirror 24 in the path of the expanding beam from the negative lens 22, the first beam folding mirror 24 being disposed slightly above the horizontal plane of a rotating, beam scanning polygon 26. The polygon 26 rotates about a vertical axis at 1800 r.p.m. and has ten reflecting facets with an inscribed radius of 54 mm. The pupil-to-image distance (referred below as $Z_{12}$) is equal to 600 mm and the polygon 26 has a scanning efficiency of 0.555. Rotation of the polygon 26 about its central axis images a point source onto a line that slightly deviates from a circle, lying in a plane perpendicular to the axis of rotation. Each facet of the polygon 26 successively directs the light beam into a fractional reflecting system so arranged that no obstruction is introduced as light is slightly angled in various paths above and below the plane of the polygon. This fractional system is feasible because only an X axis scan line is to impinge on the flat object field, and the vertical coverage in the imaging system is thus substantially zero. Known Schwartzchild or Burch systems employ two concentric spherical mirrors having a common center of curvature, and are arranged with properly selected radii of curvature to eliminate third order spherical aberration. In the present system similar results are obtained by a sequence of spherical mirror segments. A spherical concave mirror 28 (R = −299.771 mm) with its center of curvature at the polygon 26, is first encountered in the path of the beam deflected off the polygon facet. The beam in this region is angled slightly downwardly (see best in the side view of FIG. 2) relative to the horizontal and encounters a lower portion of the concave mirror 28, being reflected back upwardly above the polygon 26 against a flat small area reflector 30 at the system pupil. The beam then proceeds upwardly back toward an upper portion of the spherical concave mirror 28. It will be noted that the single spherical concave mirror 28 actually comprises two optical elements and that two elongated spherical mirror segments may be utilized instead, having different radii of curvature if desired. The geometry of the double reflection system substantially reduces the size of the overall envelope of the optics and enables them to be contained within a substantially smaller housing. The second reflected scanning beam returned off the upper portion of the concave mirror 28 is directed against a convex mirror 32 (R=88.331 mm) also having a common center of curvature at the polygon face. This system provides a decentered pupil at the center of curvature having only off-axis aberrations that derive from the spherical aberration, and may be compensated by tilting of the negative lens 22 inasmuch as compensation is needed in only one direction. Both th principal beam and reference beam deflected off the convex mirror 32 are now slightly converging scanning beams that will focus at the reference plane, and are directed to a mid-region of the spherical concave mirror 228, where they are intercepted by an angled elongated mirror 33 and directed upwardly to a top mirror 35 whose lower horizontal surface directs the principal beam down to scan the scan line at the reference plane. The closely adjacent reference beam, however, engages the edge of a second angled mirror 37 and is diverted laterally through the indicia on the reference scale 14 to energize the detector 16.

As each facet of the polygon 26 pivots across the incident beam axis, therefore, the scanning beam traverses along the scan line at the document 12 in the X axis direction. With the focused beam having a blur size of about 17.5 μm at the scan line, the beam is maintained at constant size through a $+10°$ polygon scan angle relative to the center line, this angle being doubled to $+20°$ at the format field because of the reflection and covering a distance of 17-½" (444 mm) in the example. This enables the system to write with the high resolution of 2000 pixels per inch and at the rate of 300 lines/sec., because the 10 faceted polygon 26 is rotated at 1800 r.p.m. This high resolution, achromatic, high speed, system is economically feasible only because of the present reflective optic system with dynamic field flattening. Chromatic errors are not introduced, light transmission efficiency is very high and spherical aberrations are largely compensated.

Those skilled in the art will recognize that high resolution optical systems involve consideration of various aberrations, including higher order spherical aberrations, and that the development of prescriptions for the elements to be used in particular combinations, involving predetermined system sizes, numerical apertures and economic considerations, can involve complex design procedures. It will be noted in this respect that the system shown and described above relative to FIGS. 1-3 has a numerical aperture of reasonable value despite the fact that the optical elements are of sizes that are readily feasible on economic and practical bases. Also, this approach minimizes third order spherical aberrations. Because the system employs a decentered pupil and stop at the center of curvature it differs from typical systems in this respect as well. Because scanning coverage is limited to the horizontal field it can employ a fractional configuration.

Figure 4:
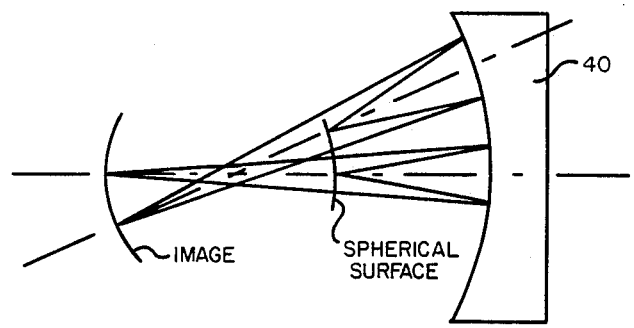
FIG. 4 is a graphical depiction of the relationship of circular image lines and to spherical reflecting elements in an imaging system, useful in explaining the operation of the system of FIGS. 1-3.
Figure 5:
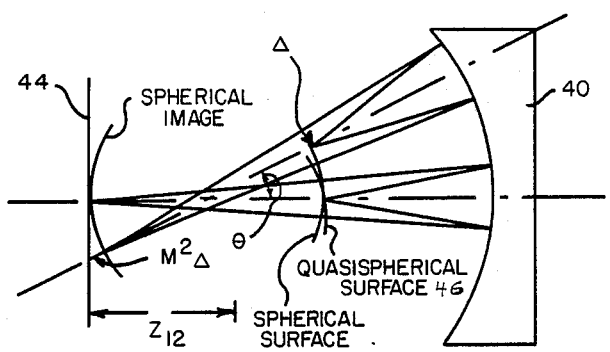
FIG. 5 is a graphical depiction of the imaging of a quasispherical surface with spherical reflecting elements, also useful in explaining the operation of the system.

The dynamic field flattening concept, however, utilizes balanced relationships that pertain to the geometry and mathematical factors that control system design. A spherical mirror by itself images a circular line into another precisely circular line, as seen in the diagrammatic view of FIG. 4. Any spherical line or spherical surface will be imaged onto a spherical image surface. To understand the coaction between the imaging system and the scanner in the present invention, however, it must be appreciated that a condition is established in which a quasispherical line (or surface) is imaged, as seen in FIG. 5. In FIG. 5, the same concave mirror 40 is shown disposed relative to a flat object plane 44, while the quasispherical surface is shown as a line 46. In FIG. 5, the distance between the exit pupil and image is shown as $Z_{12}$ and the longitudinal deviation of the object line from a perfect circle is shown as $\Delta$. For a scanning angle $\theta$ and a lateral magnification M, the following first order relationship applies:

$$\Delta = \frac{2Z_{12}}{M^2} \frac{\sin^2\theta/2}{\cos\theta} \qquad \text{Equation (1)}$$

Figure 7:
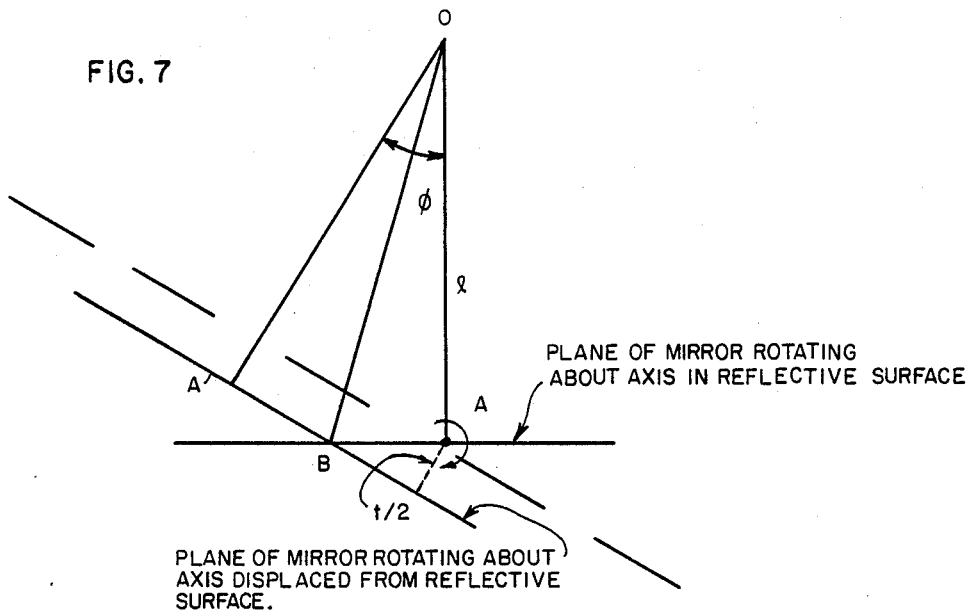
FIG. 7 is a diagram of the geometry of an off-axis scanning system used for purposes of explanation.

In the system of FIGS. 1-3, the flat reflecting surface defined by each facet of the polygon 26 rotates about a parallel axis of rotation at a distance l. Thus the mirror images a point source (the diverging incoming laser beam) on a line whose displacement from a circle is given by:

$$t = 4l \sin^2 \phi/2 \cos \phi \qquad \text{Equation (2)}$$

where $\phi$ is now the angle of rotation of the facet or the mirror. This relationship is depicted in FIG. 7, in which the different variables are also shown as a basis for the derivation of Equation (2). Essentially, as the angle of the polygon surface rotating about the center of rotation (0) changes by angle $\phi$, the point of reflection moves in and out, thus changing the image point so as to follow a quasispherical surface. The quasispherical surface depicted in FIG. 5, however, cannot without proper consideration of other factors provide focusing on a flat object plane. Essentially, systems and methods in accordance with the invention utilize the quasispherical image created during dynamic motion o the polygon facets into a magnified image which deviates in a sense and amplitude from a circle so as to create a flat image line. The error introduced by the facet variation thus is used in conjunction with the status imaging system for dynamic field flattening. However, a perfectly flat image line would require that $\Delta = t$, so that:

$$2Z_{12} \frac{\sin^2\phi}{\cos 2\phi} = 4M^2 l \sin^2\phi/2\cos\phi \qquad \text{Equation (3)}$$

Figure 6:
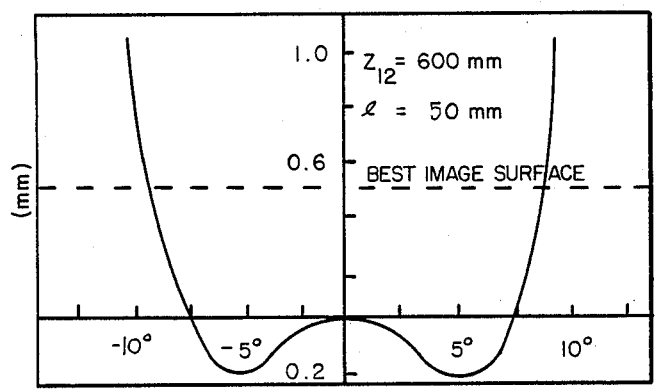
FIG. 6 is a graph of field flatness mismatch for different mirror scan angles utilized in an exemplar system in accordance with the invention.

This precise condition cannot be attained since the angular terms do not cancel for an arbitrary angle $\phi$, although precise focus can be achieved at $\phi=0$ and at equal positive and negative variations at some fixed point on each side of zero, depending upon magnification. This relationship is depicted in FIG. 6, in which field flatness mismatch is shown as a function of mirror angle, given the $Z_{12}$ value of 600 mm and the l value of 50 mm for the practical system being described. However, systems in accordance with the invention further make use of the fact that the system depth of focus can be adequately large to insure that beam size essentially remains constant. As seen in FIG. 6, there is no field flatness mismatch at $\phi = 0, +7.5°$ and $-7.5°$. For $+10°$ scan angle, the deviation from a flat line at $\phi = 10°$ is 1.181 mm. FIG. 6 depicts how the image plane can be positioned relative to the field mismatch so that there is a substantially equal amount of positive and negative defocus, so that the out of focus range need only in the present instance be no greater than $+0.692$ mm. In the present example, using an HeCd laser with a wavelength of 441.6 nm this is within the Rayleigh range of a Gaussian spot of 19.73 μm in diameters (measured at the $e^{-2}$ points).

Figure 8:
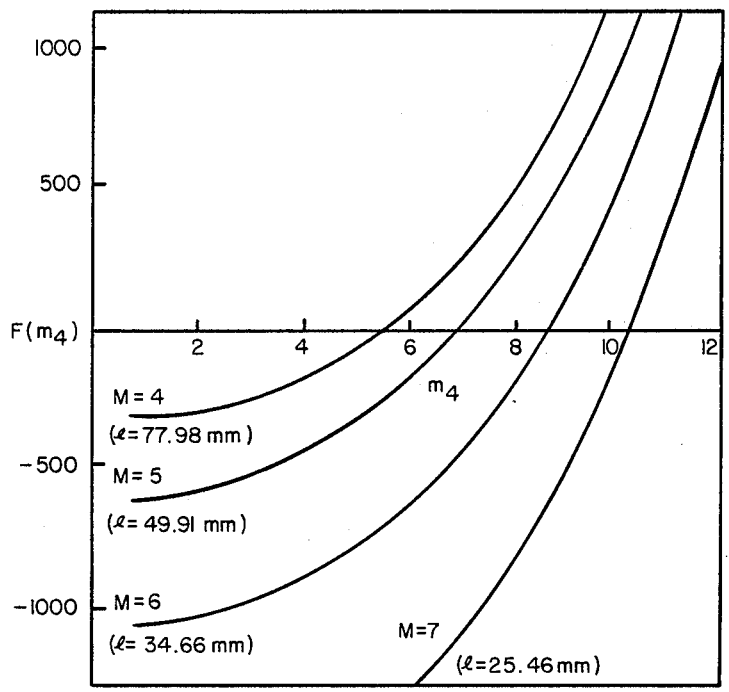
FIG. 8 is a diagram of variations in system parameters that affect optical performance.

Certain optical design considerations must be taken into account to insure that the beam is diffraction limited over the scan angle. In order to obtain this characteristic in a system of reasonable size the magnification Ms is obtained by using the three spherical mirror surfaces, rather than two. The three-mirror system comprises two concave mirror segments, which can be at different radii relative to the axis of concentricity, and a convex mirror. In the present example, the spherical concave mirror 28 provides both of the concave surfaces, and the same radii of curvature are therefore used. The presence of the third mirror surface in the imaging system creates some imbalance, because one reflecting surface of the spherical concave mirror 28 and the convex mirror 32 correct each other for spherical aberration, but the second concave surface adds a new spherical aberration so that the system is again undercorrected. However, as pointed out previously, the negative lens 22 at the prescanning position in the input collimated beam provides the necessary correction. Using the configuration of FIGS. 1-3, the prescription for the different surfaces in the system can be defined by conventional means using the relationship:

$$W_{o4o} = -\frac{1}{1024} P \frac{1}{F^3} F(m_4) \quad \text{Equation (4)}$$

$$F(m_4) = m_4^3 + m_4^2(M + 4) + m_4(4 - M^2) - (5M^3 + 4) \quad \text{Equation (5)}$$

Where $W_{o4o}$ is the third order spherical aberration, P is the pupil radius and F# is the F number (to the third power) in Equation (4). The graph of FIG. 8 depicts various values of third order spherical aberration in the three concentric mirror system in relation to $F(m_4)$. It is found that increasing values of $m_4$ for increasing values of M tend to provide the best solution for reduction of spherical aberration. However, the working magnification of $m_4$ changes during scanning because the object line for $m_4$ is dependent upon the object distance-to-image-distance ratio, which changes because of the off-axis position of the scanning surface. To keep a balance between system performance and size, the system is operated in an area where the $F(m_4)$ curve differs from zero, and the residual spherical aberration is corrected by the negative lens in the prescanning beam to create the initial object point. It will be recognized that similar corrections may be achieved by the use of an aspheric mirror or holographic optical element in the pupil, which is defined by the beam folding mirror 24 above the scanning polygon 26. A convex mirror may also be utilized for the same purpose in the prescan section.

The concepts of the invention may be employed with a wide range of flat field scanning systems, of both the reading and writing types. Wherever light attenuation, chromatic effects and spherical aberrations present significant problems, systems and methods in accordance with the invention can be of particular utility. One example of such a system is a high resolution flat field laser display system in which one collinear multi-color beam, or parallel beams of different colors, are to be scanned to generate a raster image. The use of spherical reflecting surfaces together with the attendant minimization of chromatic aberration and minimal beam attenuation are of great utility in this application. The increasing usage of microminiature photosensitive devices, such as charge coupled device arrays, provides another field of use, inasmuch as these arrays cannot be readily manufactured in any other than a flat planar configuration. It should further be evident from the above discussion that a two-mirror system can be employed in the modified Schwartzchild configuration, wherever volumetric considerations permit or system performance dictates the need. It will also be evident that the term "spherical" as applied to the reflecting surfaces described herein refers essentially to a first order of magnitude control of dimension, but that minor deviations may be utilized for specific effects or corrections, in accordance with factors known to those skilled in the art. Similarly one or more of the spherical mirrors may be tilted for the introduction of compensation in certain applications.

A significant further application of the system derives from the fact that the scanning optics are purely reflective surfaces. A high power focused beam can thus be generated and scanned for the many applications in which such beams are now used.

Although there have been described above and illustrated in the drawings various forms and modifications in accordance with the invention, it will be appreciated that the invention is not limited thereto but encompasses all variations and alternatives within the scope of the appended claims.

What is claimed is:

1. A system for scanning a non-collimated light beam in focus along a scan line and across a flat field plane comprising:

scanning means, including a reflecting mirror surface in the path of the light beam, the reflecting mirror surface pivoting about an axis spaced apart from the mirror surface for imaging the light beam along a scanning path to define an image curve deviating from a circular line due to variations in the position of the mirror surface as it pivots and changes the object distance as a function of scanning angle; and imaging means disposed in the scanning path of the beam reflected from the mirror surface and including at least two spaced apart focusing optical elements, the at least two optical elements having curvatures, and spacings between them, chosen to provide magnification of the scanning beam which varies with the scanning angle, the magnification variation being chosen such that the magnitude and sense oppose the deviation from a circular line introduced by the scanning means, to focus the beam image at the flat field plane within the limits of the scan line.

2. The invention as set forth in claim 1 above, wherein the light beam has substantially the same size along the scan line.

3. The invention as set forth in claim 2 above, wherein the light beam is diffraction limited along the scan line.

4. The invention as set forth in claim 2 above, wherein the deviation from the circular introduced by the imaging means is arranged relative to the position of the flat field surface to deviate substantially equally in negative and positive senses along the scan line length at the flat field surface such as to maintain the beam focus within its depth of field at the flat field surface.

5. The invention as set forth in claim 2 above, wherein the imaging means comprises solely reflective elements having concentric surfaces.

6. The invention as set forth in claim 5 above, wherein the scanning means and imaging means are substantially free of chromatic aberration.

7. The invention as set forth in claim 5 above, wherein the scanning means and imaging means comprise solely elements capable of forming a high power focused beam without degradation.

8. The invention as set forth in claim 5 above, wherein the imaging means comprises first and second concave mirrors and a convex mirror disposed to reflect the beam successively, said mirrors being spherical and having a common center of curvature.

9. The invention as set forth in claim 8 above, wherein the first and second concave mirrors are different surfaces of a common concave mirror and wherein the system further includes a first light beam folding mirror disposed to reflect light from the first concave mirror surface onto the second concave mirror surface, and in addition a pair of elongated light folding mirrors directing the light beam from the second concave mirror surface to the flat field object plane.

10. The invention as set forth in claim 5 above, wherein the system includes means providing a collimated input light beam and wherein the system further includes means in the path of the collimated beam for expanding the light beam prior to impinging on the mirror surface of the scanning means.

11. The invention as set forth in claim 10 above, wherein the means for expanding the light beam comprises a negative lens.

12. The invention as set forth in claim 11 above, wherein the negative lens is tilted to compensate for astigmatism and coma in the system.

13. The invention as set forth in claim 2 above, wherein the input beam comprises a principal beam and a closely spaced reference beam, and wherein the system further includes means subsequent to the imaging system for separating the reference beam from the principal beam.

14. The invention as set forth in claim 13 above, wherein the means for separating comprises mirror means disposed parallel to the scan line and solely in the path of the reference beam after the imaging means for deflecting the reference beam in a non-parallel direction.

15. A system for providing, from a input beam, a diffraction limited scanning beam focused on a wide flat field throughout a wide scan angle centered on a central axis comprising:

scanning mirror means including a mirror surface rotating through an arc and disposed at a spacing from the axis of rotation, the scanning mirror surface being in the path of the input beam and reflecting the beam through the scanning angle, the spacing of the surface from the axis of rotation causing object distances to vary within the scan angle to provide a scanning beam defining a noncircular curved line image centered on the central axis; and a beam imaging system comprising at least two spherical mirrors having a common center of curvature and an aperture at the common center of curvature for serially reimaging the scanning image from the scanning mirror means, the beam imaging system being corrected for spherical aberration, the reflective surface of the scanning mirror means being approximately at the common center of curvature and the beam imaging system varying the magnification of the scanning beam by changing object distance as a function of beam position off the central axis with a deviation and in a sense throughout the scan angle to compensate the variations in distance introduced by the scanning mirror means and provide a focused beam throughout the wide flat field.

16. The invention as set forth in claim 15 above, wherein the lateral magnification M, the scanning angle $\phi$ of the mirror means, the spacing l of the mirror means surface from the axis of rotation, and the pupil to image distance $Z_{12}$ are selected such that:

$$2Z_{12} \frac{\sin^2\phi}{\cos 2\phi} \simeq 4M^2 l \sin^2\phi / 2\cos\phi$$

within the depth of focus of the beam.

17. The invention as set forth in claim 16 above, including in addition means comprising at least one beam folding mirror disposed in the path of the scanning light beam from the beam imaging system to direct the scanning beam orthogonally relative to the direction from the scanning mirror means and toward the flat field.

18. The invention as set forth in claim 17 above, wherein the scanning mirror means comprises a rotating polygon having multiple reflective facets symmetrically spaced about a central axis of rotation and wherein the beam imaging system comprises solely reflective surfaces defining a fractional system and the means to direct the scanning beam comprises at least two planar reflecting surfaces within the volume occupied by the beam imaging system.

19. A system for scanning a substantially collimated input beam across a flat reference plane with substantially diffraction limited focusing along a relatively long scan line and through a relatively wide angle comprising:

a scanning polygon having multiple reflecting facets and rotating about a central axis perpendicularly disposed relative to the reference plane, the input beam being directed at the scanning polygon and the beam reflected therefrom being slightly non-parallel relative to the reference plane;

a first spherical concave mirror having a center of curvature at the nominal center of a facet of the rotating polygon and being disposed spaced apart in relation relative to the reference plane, and positioned in facing relation to the scanning polygon to reflect the scanning beam from a first surface portion thereof;

flat mirror means disposed adjacent the rotating polygon in the path of the reflected scanning beam, the flat mirror means forming a pupil for reflecting the scanning beam back to a second surface portion of the concave mirror, the second surface portion being spaced further from the reference plane than the first surface portion of the concave mirror;

convex mirror means having a common center of curvature with the spherical concave mirror and disposed to intercept the scanning beam reflected off the second surface portion of the concave mirror and to reflect the scanning beam as a converging beam; and optical beam folding means including at least one elongated flat surface disposed in the path of the scanning beam from the convex mirror means for deflecting the light beam toward the reference plane with a selected total path length such that the converging beam is in focus within the depth of focus at the reference plane.

20. The invention as set forth in claim 19 above, further including means in the path of the substantially collimated input beam for expanding the beam to compensate for higher order spherical aberration prior to impingement on the scanning polygon.

21. The invention as set forth in claim 19 above, wherein the convex and concave spherical mirrors comprise a fractional imaging system and the system provides an asymmetric pupil decentered by the scanning polygon relative to the concave mirror and convex mirror system.

22. The invention as set. forth in claim 21 above, wherein the optical beam folding means comprise a first elongated angled planar reflecting element between the first and second surface portions of the concave mirror and in the path of the beam reflected from the convex mirror for diverting the scanning beam away from the reference plane and substantially normal thereto, and a second elongated planar reflecting element for directing the scanning beam back to scan line along the reference plane.

23. The invention as set forth in claim 22 above, including in addition a lower power reference beam provided as input nearly parallel to and closely spaced apart from the input beam, the reference beam passing through the scanning polygon and the beam imaging system in parallel thereto, and the system further comprising reflecting mirror means disposed parallel to the reference plane and in noninterfering relation to the scanning beam directed toward the reference plane, but positioned to deflect only the scanning reference beam at an angle other than perpendicular to the reference plane, such as to enable scanning of a different surface.

24. The invention as set forth in claim 23 above, further including reference scale indicia means disposed adjacent and parallel to the scan line along the reference surface and in the path of the deflecting scanning reference beam, and detector means disposed adjacent the reference scale means and responsive to reference beam variations thereat.

25. The method of scanning a flat field with a focused light beam over a substantial distance along a scan line comprising the steps of:
dynamically scanning the light beam through an angle centered relative to a central axis while optically imaging the scanning light beam along a curved but non-circular image line such that an error from the circular varying with scan position is introduced in the beam image; and
statically magnifying the curved non-circular light beam during scanning with a magnification that varies in accordance with beam position off the central axis, the magnification varying in a sense and with a magnitude in accordance with scan position to correct the error introduced by the dynamic scanning and focus the beam along a scan line at the flat field, with focus within the depth of focus of the beam.

26. The method as set forth in claim 25 above, wherein the step of scanning the light beam comprises reflecting the light beam from a moving surface pivoting about a spaced apart axis, including further the step of correcting spherical aberration in the magnified image.

27. The method as set forth in claim 26 above, wherein the step statically imaging the image line comprises the steps of successively imaging the image line off spherical different reflecting surfaces having a common center of curvature to adjust the image along the non-circular image line such that it is in focus along a scan line on the flat object field.

* * * * *